United States Patent
Serabyn et al.

(10) Patent No.: US 10,345,572 B2
(45) Date of Patent: Jul. 9, 2019

(54) COMPACT DIGITAL HOLOGRAPHIC MICROSCOPE FOR PLANETARY IMAGING OR ENDOSCOPY

(71) Applicant: California Institute of Technology, Pasadena, CA (US)

(72) Inventors: Eugene Serabyn, Claremont, CA (US); Christian A. Lindensmith, Altadena, CA (US); James K. Wallace, Pasadena, CA (US); Kurt M. Liewer, Pasadena, CA (US); Jay L. Nadeau, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/422,241

(22) Filed: Feb. 1, 2017

(65) Prior Publication Data

US 2017/0219999 A1    Aug. 3, 2017

Related U.S. Application Data

(60) Provisional application No. 62/365,293, filed on Jul. 21, 2016, provisional application No. 62/289,682, filed on Feb. 1, 2016.

(51) Int. Cl.
*G02B 23/24* (2006.01)
*G02B 3/00* (2006.01)
(Continued)

(52) U.S. Cl.
CPC ....... *G02B 23/2484* (2013.01); *G02B 3/0087* (2013.01); *G02B 6/0005* (2013.01);
(Continued)

(58) Field of Classification Search
CPC ..... G11B 7/0065; G11C 13/042; G11C 13/04; G11C 13/044; G02B 27/22; G02B 27/44;
(Continued)

(56) References Cited

U.S. PATENT DOCUMENTS

2010/0280315 A1* 11/2010 Pan ............... A61B 5/0066
600/109
2015/0216412 A1*  8/2015 Hillmann ........ A61B 3/156
351/207

OTHER PUBLICATIONS

Sherr, B., et al., "Enumeration of Total and Highly Active Bacteria", Methods in Microbiology, 2001, pp. 129-159, vol. 30.
(Continued)

*Primary Examiner* — Jennifer D. Carruth
(74) *Attorney, Agent, or Firm* — Gates & Cooper LLP

(57) ABSTRACT

In situ investigation of microbial life in extreme environments can be carried out with microscopes capable of imaging 3-dimensional volumes and tracking particle motion. A lensless digital holographic microscope is disclosed that provides roughly 1.5 micron resolution in a compact, robust package suitable for remote deployment. High resolution is achieved by generating high numerical-aperture input beams with radial gradient-index rod lenses. The ability to detect and track prokaryotes was explored using bacterial strains of two different sizes. In the larger strain, a variety of motions were seen, while the smaller strain was used to demonstrate a detection capability down to micron scales.

21 Claims, 10 Drawing Sheets

(51) Int. Cl.
  *F21V 8/00* (2006.01)
  *G03H 1/04* (2006.01)
  *G02B 21/36* (2006.01)
  *G02B 23/26* (2006.01)
  *G03H 1/00* (2006.01)

(52) U.S. Cl.
  CPC ......... *G02B 6/0006* (2013.01); *G02B 6/0008* (2013.01); *G02B 21/365* (2013.01); *G02B 23/2469* (2013.01); *G02B 23/26* (2013.01); *G03H 1/0443* (2013.01); *G03H 1/0465* (2013.01); *G03H 2001/005* (2013.01); *G03H 2001/0436* (2013.01); *G03H 2001/0445* (2013.01); *G03H 2001/0469* (2013.01); *G03H 2001/0471* (2013.01); *G03H 2222/52* (2013.01); *G03H 2223/17* (2013.01)

(58) Field of Classification Search
  CPC .............. G02B 3/0087; G02B 21/0032; G02B 21/0036; H04N 13/00; G03H 1/26; G03H 1/04; G03H 2001/0033; G03H 2260/54; H01S 3/067; H01S 3/13
  See application file for complete search history.

(56) References Cited

OTHER PUBLICATIONS

Mitchell, J.G., et al., "Bacterial motility: links to the environment and a driving force for microbial physics", FEMS Microbiol Ecol, 2006, pp. 3-16, vol. 55, No. 1.
Son, K., et al., "Live from under the lens: exploring microbial motility with dynamic imaging and microfluidics", Nature Reviews Microbiology, Dec. 2015, pp. 761-775, vol. 13.
Nadeau, J., et al., "Microbial Morphology and Motility as Biosignatures for Outer Planet Missions", Astrobiology, 2016, pp. 755-774, vol. 16, No. 10.
Thomas, N., et al., "The microscope for Beagle 2", Planetary and Space Science, 2004, pp. 853-866, vol. 52.
Edgett, K.S., et al., "Curiosity's Mars Hand Lens Imager (MAHLI) Investigation", Space Sci. Review, 2012, pp. 259-317, vol. 170, Nos. 1-4.
Kim, M.K., "Digital Holographic Microscopy—Principles, Techniques, and Applications", Springer, 2011.
Seo, S., et al., "Lensfree holographic imaging for on-chip cytometry and diagnostics", Lab Chip, 2009, pp. 777-787, vol. 9.
Mudanyali, O., "Compact, light-weight and cost-effective microscope based on lensless incoherent holography for telemedicine applications", Lab Chip, 2010, pp. 1417-1428, vol. 10.
Wallace, J.K., et al., "Robust, compact implementation of an off-axis digital holographic microscope", Optics Express, Jun. 29, 2015, pp. 17367-17378, vol. 23, No. 13.
Lindensmith, C.A., et al., "A Submersible, Off-Axis Holographic Microscope for Detection of Microbial Motility and Morphology in Aqueous and Icy Environments", PLOS One, Jan. 2016, pp. 1-23, vol. 11, No. 1.
Stroke, G.W., "Lensless Fourier-Transform Method for Optical Holography", Applied Physics Letters, May 15, 1965, pp. 201-203, vol. 6, No. 10.
Haddad, W.S., et al., "Fourier-transform holographic microscope", Applied Optics, Aug. 20, 1992, pp. 4973-4978, vol. 31, No. 24.

Xu, W., et al., "Digital in-line holography for biological applications", PNAS, Sep. 25, 2001, pp. 11301-11305, vol. 98, No. 20.
Repetto, L., et al., "Lensless digital holographic microscope with light-emitting diode illumination", Optics Letters, May 15, 2004, pp. 1132-1134, vol. 29, No. 10.
Gurkan, U.A., et al., "Miniaturized Lensless Imaging Systems for Cell and Microorganism Visualization in Point-of-Care Testing", Biotechnol. J., Feb. 2011, pp. 138-149, vol. 6, No. 2.
Isikman, S.O., et al., "Lens-free optical tomographic microscope with a large imaging volume on a chip", PNAS, May 3, 2011, pp. 7296-7301, vol. 108, No. 18.
Zuo, C et al., "Lensless phase microscopy and diffraction tomography with multi-angle and multi-wavelength illuminations using a LED matrix", Optics Express, Jun. 1, 2015, pp. 14314-14328, vol. 23, No. 11.
Bishara, W., et al., "Holographic pixel super-resolution in portable lensless on-chip microscopy using a fiber-optic array", Lab Chip, 2011, pp. 1276-1279, vol. 11, No. 7.
Remacha, C., et al., "Tomography by point source digital holographic microscopy", Applied Optics, Jun. 1, 2014, pp. 3520-3527, vol. 53, No. 16.
Pushkarsky, I., et al., "Automated single-cell motility analysis on a chip using lensfree microscopy", Scientific Reports, 2014, pp. 1-8, vol. 4.
Su, T-W., et al., "High-throughput lensfree 3D tracking of human sperms reveals rare statistics of helical trajectories", PNAS, Oct. 2, 2012, pp. 16018-16022, vol. 109, No. 40.
Su, T-W., et al., "Sperm Trajectories Form Chiral Ribbons", Scientific Reports, 2013, pp. 1-8, vol. 3.
Sato, K., et al., "Lens-less holographic microscope with high resolving power and no-distortion", Proc. SPIE, 2011, pp. 790402-1-790402-8, vol. 7904.
Jericho, M.H., et al., "Quantitative phase and refractive index measurements with point-source digital in-line holographic microscopy", Applied Optics, Apr. 1, 2012, pp. 1503-1515, vol. 51, No. 10.
Serabyn, E., et al., "Lensless Digital Holographic Microscopy for Microbe Detection", Imaging and Applied Optics 2016, OSA Technical Digest, paper DTh3F.4.
Pedrini, G., "Short-coherence digital microscopy by use of a lensless holographic imaging system", Applied Optics, Aug. 1, 2002, pp. 4489-4496, vol. 41, No. 22.
Cuche, E., et al., "Spatial filtering for zero-order and twin-image elimination in digital off-axis holography", Applied Optics, Aug. 10, 2000, pp. 4070-4075, vol. 39, No. 23.
Koala Acquisition & Analysis, http://www.lynceetec.com/koala-acquisition-analysis/, as downloaded Jun. 1, 2017.
Colomb, T., "Numerical Aberrations Compensation and Polarization Imaging in Digital Holographic Microscopy", thesis No. 3455, Institut d'imagerie et optique appliquée, École Polytechnique Fédérale de Lausanne, 2006.
Schindelin, J., et al., "Fiji: an open-source platform for biological-image analysis", Nature Methods, Jul. 2012, pp. 676-682, vol. 9, No. 7.
Junge, K., et al., "Motility of Colwellia psychrerythraea Strain 34H at Subzero Temperatures", Applied and Environmental Microbiology, Jul. 2003, pp. 4282-4284, vol. 69, No. 7.
Pu, Y., et al., "Intrinsic speckle noise in off-axis particle holography", J. Opt. Soc. Am. A., Jul. 2004, pp. 1221-1230, vol. 21, No. 7.
Hecht, E., Optics, 4th edition, Pearson New International Edition.
Serabyn, E., et al., "Compact, lensless digital holographic microscope for remote microbiology", Optics Express, Dec. 12, 2016, pp. 28540-28548, vol. 24, No. 25.

* cited by examiner

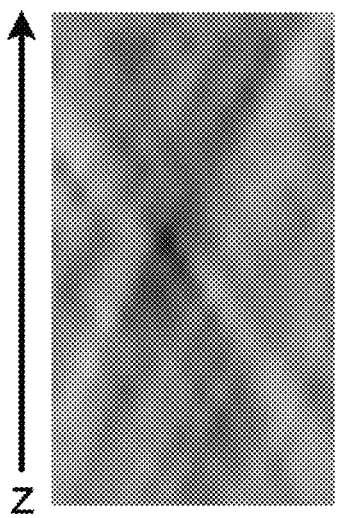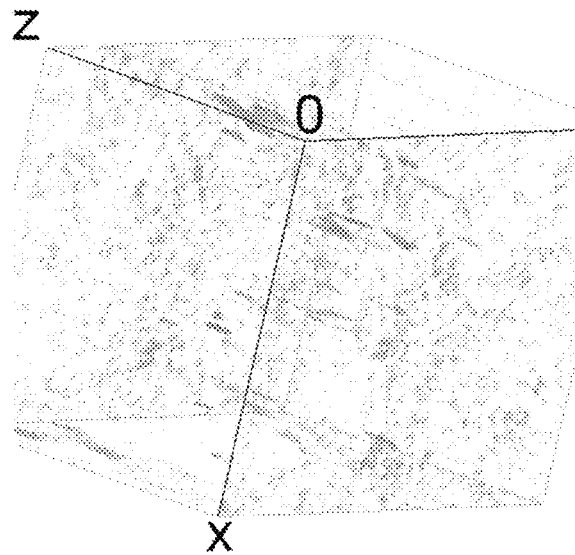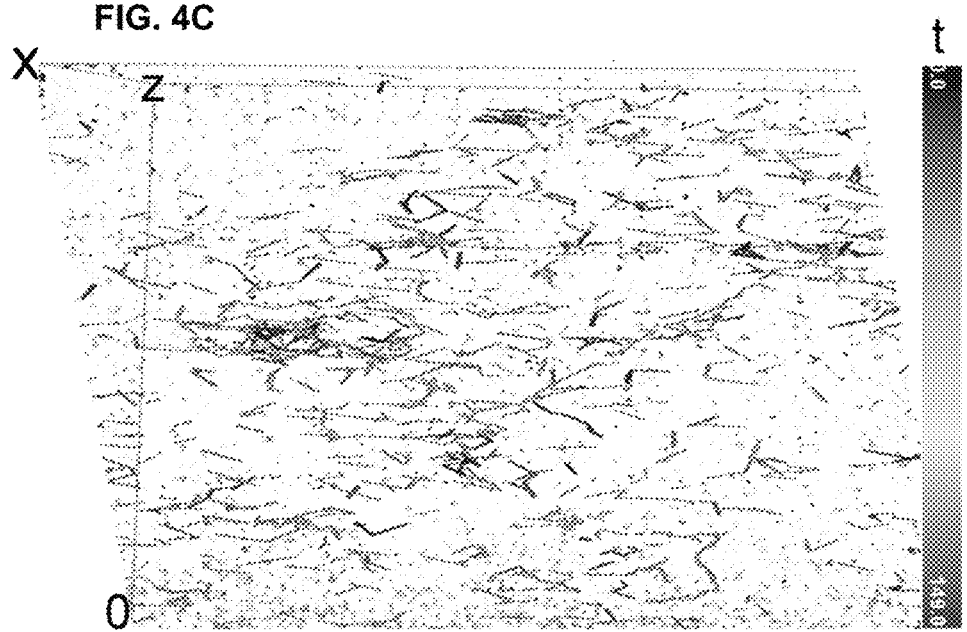
FIGS. 4A-C

COMPACT DIGITAL HOLOGRAPHIC MICROSCOPE FOR PLANETARY IMAGING OR ENDOSCOPY

CROSS REFERENCE TO RELATED APPLICATIONS

This application claims the benefit under 35 U.S.C. Section 119(e) of the following commonly-assigned U.S. Provisional Patent Applications:

U.S. Provisional Patent Application No. 62/289,682, filed Feb. 1, 2016, by Eugene Serabyn, Christian A. Lindensmith, James K. Wallace, Kurt M. Liewer, and Jay L. Nadeau, entitled "COMPACT DIGITAL HOLOGRAPHIC MICROSCOPE FOR PLANETARY IMAGING OR ENDOSCOPY"; and U.S. Provisional Patent Application No. 62/365,293, filed Jul. 21, 2016, by Eugene Serabyn, Christian A. Lindensmith, James K. Wallace, Kurt M. Liewer, and Jay L. Nadeau, entitled "A COMPACT LENSLESS HOLOGRAPHIC MICROSCOPE,"

both of which applications are incorporated by reference herein.

This application is related to U.S. Utility patent application Ser. No. 14/939,389, filed on Nov. 12, 2015, by Kurt M. Liewer, Christian A. Lindensmith, Eugene Serabyn, Stephanie Rider, Emilio C. Graff, and James K. Wallace, entitled "A COMMON-MODE DIGITAL HOLOGRAPHIC MICROSCOPE,", which claims the benefit under 35 U.S.C. Section 119(e) of commonly-assigned U.S. Provisional Patent Application Nos:

U.S. Provisional Patent Application Ser. No. 62/078,288, filed on Nov. 11, 2014, by Kurt M. Liewer, Christian A. Lindensmith, Eugene Serabyn, Stephanie Rider, Emilio C. Graff, and James K. Wallace, entitled "A COMMON-MODE DIGITAL HOLOGRAPHIC MICROSCOPE,"; and U.S. Provisional Patent Application Ser. No. 62/079,342, filed on Nov. 13, 2014, by Kurt M. Liewer, Christian A. Lindensmith, Eugene Serabyn, Stephanie Rider, Emilio C. Graff, and James K. Wallace, entitled "A COMMON-MODE DIGITAL HOLOGRAPHIC MICROSCOPE,";

all of which applications are incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

Conventional high-resolution microscopes capable of imaging bacteria have limited depth-of-field and typically require complex objective lenses with tight alignment tolerances. As a result, direct observation of prokaryotes (bacteria and archaea) in their native environments has yet to be performed in most parts of the Arctic and Antarctic, around hydrothermal vents, and in the majority of the open ocean [1]. Quantifying prokaryotic behavior in situ is important for understanding large-scale marine processes such as carbon cycling [2, 3]. It is also of great interest for the investigation of the possibility of life in extraterrestrial Ocean Worlds, such as Enceladus and Europa [4], but instruments for unambiguous detection of prokaryotes in planetary environments don't yet exist. Some microscopes have flown in space, but as yet no microscopic observations have been made on Mars with the resolution required to detect bacteria [5, 6]. For all such remote deployment scenarios, a compact, robust microscope capable of operating in an ambient environment is required.

Digital holographic microscopy [7] has a number of advantages over conventional microscopy for remote autonomous deployment, including robustness (no moving parts, as no focus mechanism is needed), high throughput, and compressed sensing (i.e., the entire 3-d sample volume is encoded in each 2-d frame capture). As a result, this technique is beginning to see application beyond the laboratory [8,9]. Our previous "common path" digital holographic microscope [DHM] design [10] reported microbial imaging in Greenland sea ice [11], but its reliance on classical lens-based optics left this prototype larger than desirable for robotic deployment. On the other hand, lensless holography, with no imaging optics between the light source and detector [12-16], can enable compact, lightweight systems.

Several lensless holographic and tomographic microscope approaches exist [8, 9, 13-26], with differing advantages and disadvantages. For example, use of incoherent light provides speckle noise reduction [15], but also reduced fringe visibility and depth of field. Tomography [17-20] can provide high resolution, but multiple reads are needed to acquire a full information set. Conversely, motion tracking does not necessarily require high-resolution imaging [8,21]. On-chip systems can provide a large field of view (FOV) by situating the sample very close to the detector array [21-23], but thermal issues can arise from differing ambient-sample and powered-detector temperatures. A more classical lensless DHM configuration with a somewhat larger sample-to-detector distance may thus be more suited to microscopic imaging in extreme environments. Of these, laser-based systems [14, 24-26] have tended to include pinholes and additional fore-optics to increase the laser-beam numerical aperture (NA), thereby increasing system volume and alignment complexity. For robustness and compactness, ideally any difficult-to-align elements such as small pinholes should be avoided, and any high-NA laser beam (or beams) should be provided without greatly impacting system volume. One or more embodiments of the present invention provide a solution to both of these issues by making use of small radial gradient-index (GRIN) rod lenses [27] or fibers to inject high NA laser beams into a lensless DHM.

SUMMARY OF THE INVENTION

The present disclosure describes an imaging system, comprising one or more gradient-index (GRIN) lenses or a pair of optical fibers; and a camera comprising an array of pixels. The camera is spaced from the one or more GRIN lenses or the pair of optical fibers, and one or more beams, refracted by the one or more GRIN lenses or emitted from the optical fibers, form interference fringes on the array after the one or more beams are transmitted through a sample positioned between the fibers and the camera or between the one or more GRIN lenses and the camera.

In one embodiment, the GRIN lenses include a first GRIN lens spaced from a second GRIN lens, wherein the first GRIN lens refracts a collimated beam, forming one of the beams comprising a first diverging beam, the second GRIN lens refracts the collimated beam, forming another of the beams comprising a second diverging beam, and the first diverging beam and the second diverging beam interfere on the array, forming the interference fringes, after the first diverging beam and the second diverging beam are transmitted through the sample.

In another embodiment, a collimator collimates electromagnetic radiation emitted from the laser and forming a collimated beam.

In a further embodiment, the imaging apparatus comprises the pair of optical fibers including a first optical fiber spaced from a second optical fiber, wherein the beams comprise a first diverging beam emitted from the first optical fiber, and a second diverging beam emitted from the second optical fiber, and the first diverging beam and the second diverging beam interfere on the array, forming the interference fringes, after the first diverging beam and the second diverging beam are transmitted through the sample.

In yet a further embodiment, the imaging apparatus comprises a single one of the one or more GRIN lenses, wherein the single GRIN lens refracts a collimated beam, forming the beam comprising a refracted beam, and the refracted beam forms interference fringes on the array of pixels after the refracted beam is transmitted through the sample.

In yet another embodiment, the imaging apparatus comprises a single one of the one or more GRIN lenses; and a beamsplitter electromagnetically coupled to the GRIN lens and the camera. The GRIN lens refracts a collimated beam, forming the beam refracted beam, and the beamsplitter splits the refracted beam into a first portion and a second portion. The first portion reflects off the sample forming a sample beam and the beamsplitter reflects the sample beam onto the array. The second portion reflects off a mirrored surface coupled to the beamsplitter, forming a reference beam transmitted through the beamsplitter and onto the array. The sample beam and the reference beam interfere on the array, forming the interference fringes.

In one or more of embodiments the array of pixels has a surface area and positioning from the assembly such that at least 90 percent of the first diverging beam's wavefront and at least 90% (or all) of the second diverging beam's wavefront are incident on the array.

In one or more embodiments, the pixels have a pitch p, the one or more beams have a wavelength λ, the GRIN lenses or the apertures have the spacing such that $f\lambda/b \geq 2p$, where f is the focal length of the one or more GRIN lenses.

In one or more embodiments, the GRIN lenses or the optical fibers are symmetrically spaced about a position on an optical axis of the imaging system.

In one or more embodiments, a number of pixels and surface area of the array are increased so as to achieve a magnification of at least 100. In one example, the imaging apparatus a length of 10 cm or less and wherein the array has a surface area of at least 10 mm by 10 mm.

The present disclosure further describes a digital holographic microscope comprising an imaging system as described herein, wherein a computer connected to the camera generates an image of the sample or an electric field map of the sample using the interference fringes. In one example, the image resolves a feature in the sample having a dimension down to 1.5 microns.

Methods of fabricating and using the imaging apparatus according to one or more embodiments are also disclosed.

BRIEF DESCRIPTION OF THE DRAWINGS

Referring now to the drawings in which like reference numbers represent corresponding parts throughout:

FIG. 3A shows *B. subtilis* in intensity. FIG. 3B shows *B. subtilis* in phase. FIG. 3C shows *Colwellia* in intensity. The arrows indicate cells in or near focus. FIG. 3D shows a *Colwellia* time track. FIG. 3E shows a zoomed-in image of *B. subtilis* in a 100 μm deep chamber. FIG. 3F shows a zoomed in image of *B. subtilis* in an 800 μm deep chamber; and FIGS. 4A-C show various three dimensional (3D) visualizations. FIG. 4A is an xz image showing a cross section through the reconstructed PSF of a *B. subtilis* cell. FIG. 4B is an image of *B. subtilis* culture at a single time. Individual cells can be identified by their extended PSFs. FIG. 4C shows 3D tracks of 30 s of cell motion of a *Colwellia* culture. Cells were identified using a maximum intensity projection. Non-motile cells (green) clustered near z=0, while trajectories of motile cells spanned the volume. Time is color-coded.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

I. Example Digital Holographic Microscopy with GRIN Lenses

In lensless holography, reference and source beams directly illuminate the detector array, without any intervening optics. However, as in standard microscopy, high-resolution holographic microscopy also requires high NA, as the linear resolution is still given by $\lambda/(2NA)$. High-NA laser beams must then be launched from just in front of the detector array, i.e., from a distance, f, of $\approx$1-3 cm for a typical cm-scale array. Moreover, in the off-axis holography case, the fringes on the detector array due to the two-beam interference pattern must have a spatial period, L, of at least twice the pixel pitch, p, $$L = f\frac{\lambda}{b} \geq 2p, \quad (1)$$

where b is the separation baseline between the two source points. For a pitch of a few a roughly mm-sized source baseline is required. While a beamsplitter could be used to separate the two launch points into separate beam paths [28], in either case a number of components must be crowded together: both point sources of light (or their reimaged foci), the sample, and the camera (as well as a beamsplitter if one is employed). Launching the beams from single-mode optical fibers is an attractive possibility, as fiber tips can be located relatively freely, and unconnectorized fibers can be used to save space. However, typically available single-mode fibers have lower NAs than is necessary for μm-scale resolution, especially at shorter (blue/violet) wavelengths. The goal for off-axis holography is thus to provide, with minimal optics, a pair of high NA laser beams in close proximity to each other.

Figure 1A:
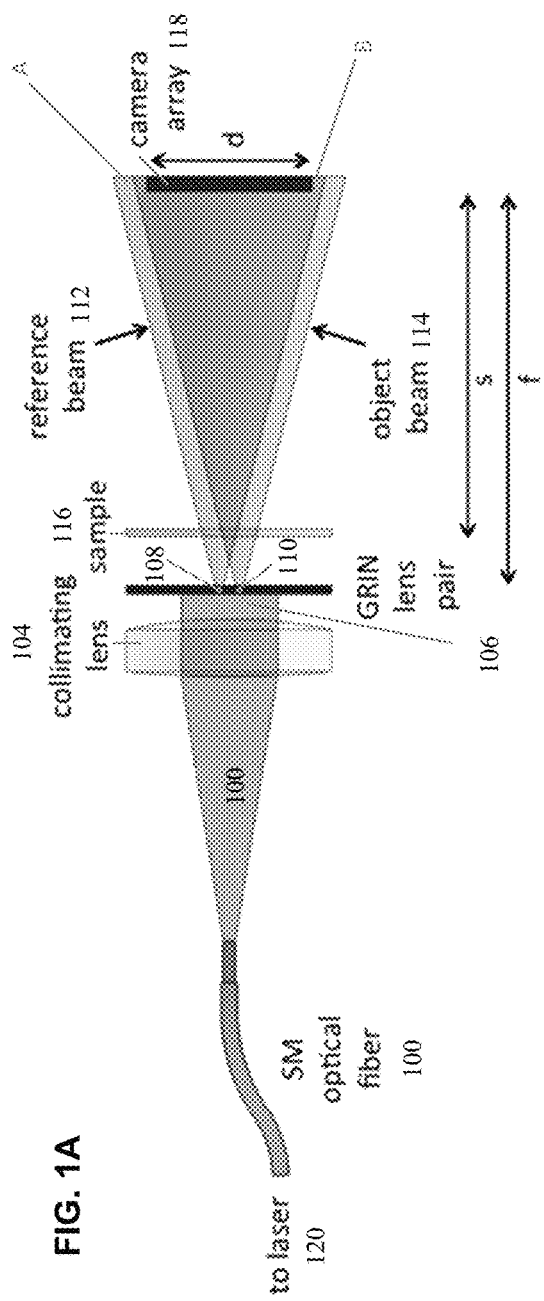
FIG. 1A shows a schematic layout of a dual-beam off-axis DHM.

One or more embodiments of the present invention achieve this by using small GRIN rod lenses to increase the NA of a single-mode (SM) fiber output beam. GRIN lenses with mm-scale diameters and lengths are readily available at low cost, and can be used to produce a high NA output focus from a collimated input beam [27]. A schematic of the conceptual design is shown in FIG. 1A. A single single mode (SM) fiber output beam 100 emitted from a SM optical fiber 102 is first collimated by a small fiber-collimating lens 104, and the collimated beam 106 then over-illuminates a pair of GRIN lenses (first GRIN lens 108 and second GRIN lens 110), yielding a pair of high-NA focal spots in their common output plane. Illuminating both GRIN lenses with a single collimated beam removes the need for a second fiber, and makes the system common-mode until the fiber tip, thereby eliminating potential pathlength drifts to which a dual-fiber system would be susceptible. From the coplanar output foci, the two beams (reference beam 112 and object beam 114) expand at high NA to pass through the sample 116 and fill the camera array 118. Electromagnetic radiation from a laser 120 is coupled into the fiber 100. In this embodiment, no optical elements (other than the sample) are between the source pair and the detector array, so that the imaging stage itself is lensless.

Although FIG. 1A shows the dual-beam off-axis DHM case, this approach can also enable a single-beam in-line DHM, by instead using only a single GRIN lens. In either case, the use of GRIN lenses eliminates the need to use or align focal-plane pinholes, as the input beam to the GRIN lens(es) is collimated. However, as is well known [7], off-axis holography enables the separation of the DC from the real and virtual images, allowing for straightforward reconstructions of both amplitude and quantitative phase images. The latter is of great value for biological samples, many of which are transparent in amplitude. In general, off-axis holography shows a higher signal-to-noise ratio (SNR) than in-line holography because of the elimination of these images (verified in practice for our GRIN system), and so permits reconstruction in denser samples than in-line. However, in the particular dual-beam configuration described in FIG. 1A, the two input beams overlap to a large extent at the sample plane, which re-introduces a second image. While this makes the study of extended objects more difficult, the overlap should not be a problem for the specific embodiment of searching for a sparse population of small single-cell microorganisms, as the two image planes are at opposite reconstruction distances, and so the second image will be well out of focus, and hence very faint and extended. On the other hand, the second image in effect increases the search region.

Figure 1B:
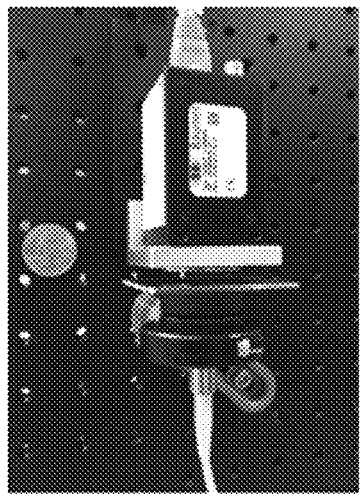
FIG. 1B shows a solid model of the DHM.
Figure 1C:
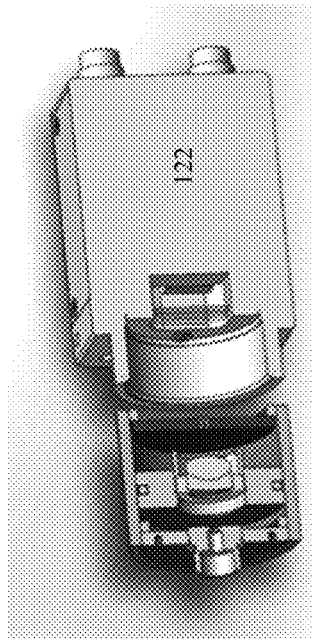
FIG. 1C is a photograph of the assembled DHM used for the results presented herein and according to one or more embodiments. The (yellow) SM fiber laser input is at the left, and the Ethernet camera (Baumer model TGX50-P) output (orange) is to the right.

A solid model of the housing 122 for the imaging apparatus of FIG. 1A is shown in FIG. 1B, and a photograph of the assembled instrument is shown in FIG. 1C. The GRIN lenses (EFL=0.92 mm, NA=0.55) were mounted side-by-side in a black 3d-printed disk (25 mm diameter and 2 mm thick) and both the "GRIN disk" and the fiber-collimating lens (6 mm diameter) were tube-mounted (25 mm diameter). This "source assembly", with a total length of $\approx$25 mm, provides at its output the desired pair of NA=0.55 focal points spaced by 1 mm. The use of GRIN lenses thus allows a total "source assembly" volume of $\leq$1 cubic inch. Moreover, being enclosed in a short tube, the source assembly is very stable, and the over-illumination of the GRIN lens pair by a collimated beam eliminates any need for alignment of the GRIN disk. As centering the camera on the source assembly tube is also trivial, there are no difficult alignment steps involved. The only degrees of freedom are then the distances from the detector array to the planes of the sample and the GRIN foci, s and f, respectively (FIGS. 1A-C). With f$\approx$25 mm, the entire microscope is also quite compact, with a total system length of $\approx$10 cm in FIG. 1C, roughly half that being due to the camera. In our lab setup, the camera distance is adjustable by means of a translation stage, but the stage is not needed in deployable units.

Image reconstruction was by means of direct propagation from the hologram plane after applying Fourier filtering [7,29], using either the Koala (LynceeTec) software package [30] or a custom MATLAB routine. The short spacings involved introduce some geometric distortion of the fringes (variable spacing and slight curvature), which is further complicated by passage through the sample media. Best reconstruction thus required subtraction of a reference hologram [31], which was produced either by imaging through an empty sample chamber or, in the case of a dilute sample with moving objects, choosing a single time point as a reference. The aberration phase map obtained from the reference-frame reconstruction was low-pass filtered and propagated back to the CCD plane for automatic subtraction from all of the holograms in an observation sequence. The aberration-corrected holograms were then directly propagated within Koala or MATLAB to yield image cubes. Holographic images were typically acquired continuously at 7-15 frames per second, and reconstructed in real-time (Koala), or close to real time (MATLAB) with standard Dell computers.

Figures 2A, 2B, 2C:
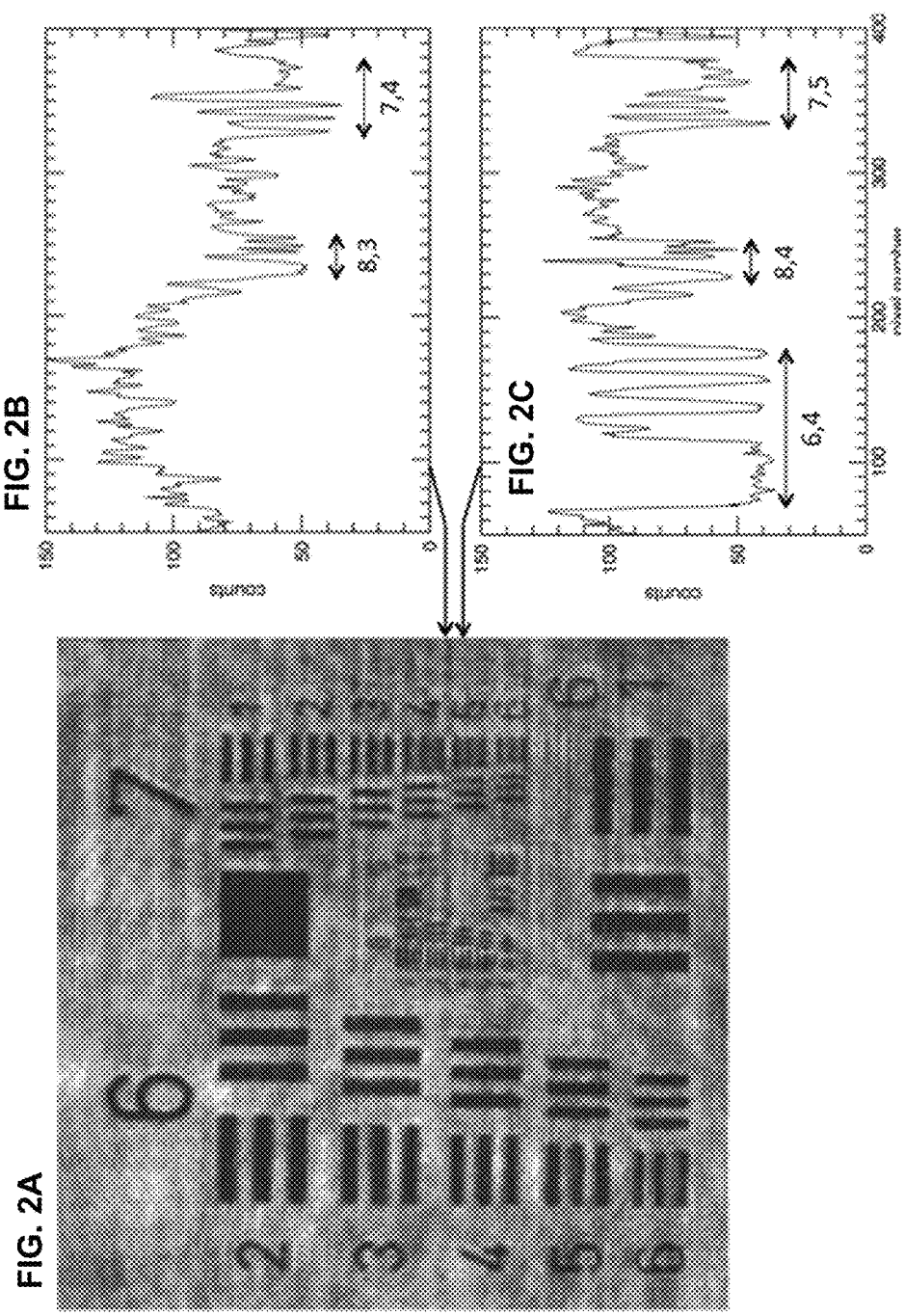
FIG. 2A shows a reconstructed image of the central region of an Air Force target acquired with the DHM illustrated in FIGS. 1A-1C.
FIG. 2B is a horizontal crosscut through the image intersecting target elements 8,3 and 7,4.
FIG. 2C is a horizontal crosscut through elements 6,4, 8,4 and 7,5. Arrows show the crosscut locations.

FIG. 2A shows a reconstructed image of an Air Force target that was acquired with the DHM of FIG. 1C and the direct reconstruction procedure described. As the figure shows, this system resolves all of the elements of group 7 on an Air Force target and roughly half those in group 8. Note that the greyish, non-uniform background that extends across the image is due to the out-of-focus laterally-shifted image of the large outer opaque elements in the extended Air Force target in the complementary image. This background structure would be much reduced if these larger-scale opaque structures did not surround the region of interest, as will be the case for biological targets. For this reason, FIG. 2A is far from a best case. FIGS. 2B and 2C show two horizontal cross-cuts through the image of FIG. 2A, where it can be seen that the vertical bars in element 3 of group 8 show fairly deep modulation, while element 4 of group 8 has a reduced fractional modulation, and is closer to the background fluctuation level near these elements. With line widths in the two cases of 1.55 and 1.38 µm, respectively, and allowing for the fact that some residual astigmatism and background contamination may be present in the image, in rough terms this demonstrates an ability to resolve features (line widths) down to ~1.5 µm. This resolution is roughly as expected, as a source NA of approximately 0.17 for s≈20 mm yields an expected resolution of ≈1.2 µm. Moreover, as all instrumental parameters and correction techniques available have not yet been fully explored or exploited (in particular, the integral C-mount on the front of the camera constrained the source-detector distance to be larger than the C-mount length), and as the mottled background due to the second beam is significant for the case of Air Force targets, the ultimate performance of this approach has likely not yet been reached.

With no optical elements between the GRIN foci and the camera, the depth of field extends essentially from the GRIN focal plane to the detector plane, with the resolution degrading from ≈1.5 µm at our sample location to 3.45 µm (the camera pixel size) at the detector plane. This extended depth of field was verified by translating the sample along the optical axis as much as allowed by the GRIN disk assembly and the camera C-mount, with sample motions over a range of ≈6 mm yielding similar performances. As to the field of view, similar triangles defined by the angle subtended by the array diameter, d, from the GRIN lens focus give $$\frac{FOV}{d} = \frac{f-s}{f}. \quad (2)$$

With a 7 mm array, s≈20 mm and f≈25 mm yields FOV≈1.4 mm. It should be possible to increase the FOV by removing the camera's C-mount to access smaller values of s. Finally, with the aberration-correction step described above, the resolution did not degrade noticeably across the image, e.g., FIG. 3B.

1. Demonstration Prokaryote Observations

Figures 3A, 3B, 3C, 3D, 3E, 3F:
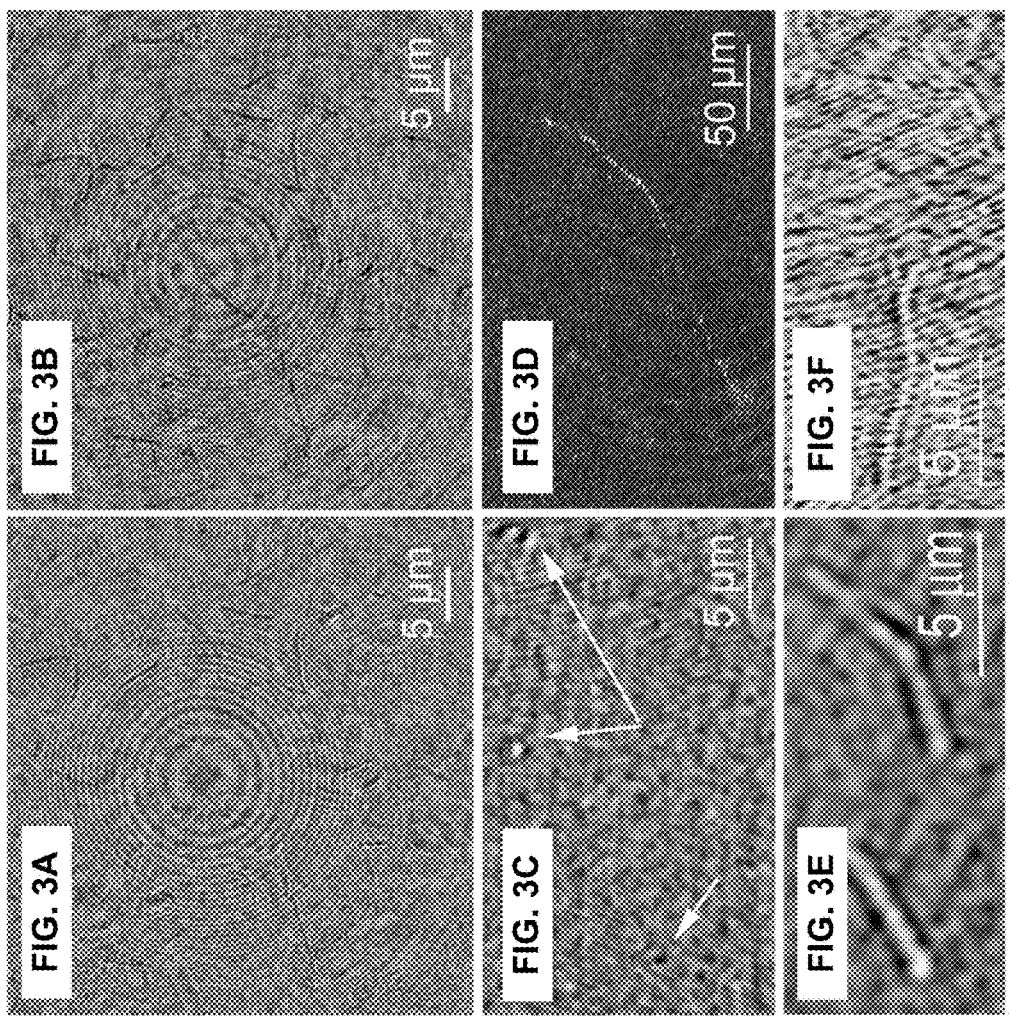
FIGS. 3A-F show bacterial strains imaged with the DHM of FIGS. 1A-1C.

The ability to image and track prokaryotes was demonstrated on two test strains of different sizes, morphologies, and motility patterns. A sample chamber depth of 0.8 mm was made using optical quality cell culture wells (Electron Microscopy Sciences, part no. 70326-30) topped with a microscope slide or coverslip. The reference and object beams both passed through the sample. Hologram time series of 30-60 s at 7-15 frames per second were recorded and reconstructed as described. The resultant intensity images were median subtracted using Fiji [32], and the phase images cropped to exclude the edges, but otherwise unprocessed. FIGS. 3A & 3B show single-plane amplitude and phase images of the larger bacterial strain (*Bacillus subtilis* ATCC 6051) that was fully resolved by our DHM. The cells were grown to mid-log phase in Lysogeny Broth (LB), and then immediately before imaging, diluted to a concentration of ~$10^7$/mL in motility medium (10 mM potassium phosphate, 10 mM NaCl, 0.1 mM EDTA, 0.1 mM glucose, pH 7.0). As is readily apparent in Visualization 1 and Visualization 2, the cells were highly motile, with a swimming speed of ~5-10 µm/s. For this larger bacterium, translational, rotational, bending and oscillatory motions are all very evident in Visualization 1 and Visualization 2. Some stationary cells, presumably adhering to the slide surfaces, are also seen.

Next, the ability to detect unresolved cells in dilute solutions was demonstrated using a smaller bacterial test species. For this we used the marine psychrophile *Colwellia psychrerythraea* strain 34H, which measures approximately 1×0.5 µm and demonstrates rapid motility (up to 100 µm/s) [33]. The cells were maintained in ½ strength Marine Broth (Difco) at 6° C., and diluted into the same culture medium for imaging. Their existence and motility was readily observed—when in focus, the cells appeared as bright spots in both intensity and phase. FIG. 3C shows a single-plane amplitude reconstruction of organisms at a density of ~$10^7$ cells/mL, and FIG. 3D shows a time track constructed from amplitude data. Amplitude and phase videos of a single-plane reconstruction sequence were obtained, in which a number of cells are seen to move across the field, thus demonstrating that such a microscope can be used for remote life searches down to somewhat below the instrumental resolution.

The choice of 800 µm deep sample chambers represented a compromise between SNR and freedom of axial movement. While the instrument's performance did not degrade substantially through a thicker air path, the signal-to-noise ratio of a particle suspension at high particle densities is inversely proportional to the product of the particle number density and the sample chamber depth [34]. FIGS. 3E and 3F show a comparison of *B. subtilis* cells in the 800 µm deep chamber vs. cells in a chamber 100 µm deep, illustrating the increased contrast seen with thinner samples. If only 2-dimensional images are required, thinner chambers can be employed.

The resolution obtained in all three dimensions, and the ability to track essentially unrestrained axial motion, may be appreciated by examining 4-dimensional data sets. Reconstructions in amplitude and phase were performed every 1.2 µm through the depth of the sample, permitting a three-dimensional view of the organism concentration and activity. FIG. 4A shows an xz image of a single *B. subtilis* cell, illustrating the conical spread of the image along the z-axis (the propagation direction). FIG. 4B shows a thresholded image of the entire volume of the *B. subtilis* sample. The spread of the individual cells along z can again be discerned. To achieve a resolution in z comparable to that seen in x and y, the point spread functions of the individual cells must be fitted to obtain the best focus. FIG. 4C presents the maximum intensity projections of the video data across 30 s of a recording of the *Colwellia* culture. It can be seen in both FIGS. 4B and 4C that many of the cells in this culture were non-motile and clustered near the two surfaces of the slide. However, a significant density of live cells moving rapidly in x, y, and z can be seen between the chamber boundaries.

As demonstrated here, combining high-resolution, large depth of field and FOV, compactness, low weight (~100 gm for the optical system), robustness, and high data compression with real-time imaging and reconstruction is quite practicable with the GRIN-based approach described herein. Moreover, it is expected that the ultimate performance of this approach has not yet been reached. Other approaches to lensless digital holographic microscopy optimized for different applications exist, but the compact system described here is aimed at field and robotic use, and combines direct amplitude and phase imaging with tracking of microorganisms in dilute samples taken from bodies of water in remote environments. Especially intriguing in this regard is the possibility of space deployment. For autonomous deployment, the next steps beyond system optimization are miniaturization of the associated electronics and making them resistant to the required environmental conditions (i.e. temperature extremes and high pressure). Further aberration correction steps as well as limits of performance remain to be investigated, and it will be necessary to customize and integrate an appropriate microfluidic system for sample collection, pre-concentration, and delivery. Finally, it is noted that beyond the specific application described here, the use of GRIN lenses to provide a compact array of coherent point sources of light should have further applicability.

II. Single GRIN Lens Examples

Figure 5:
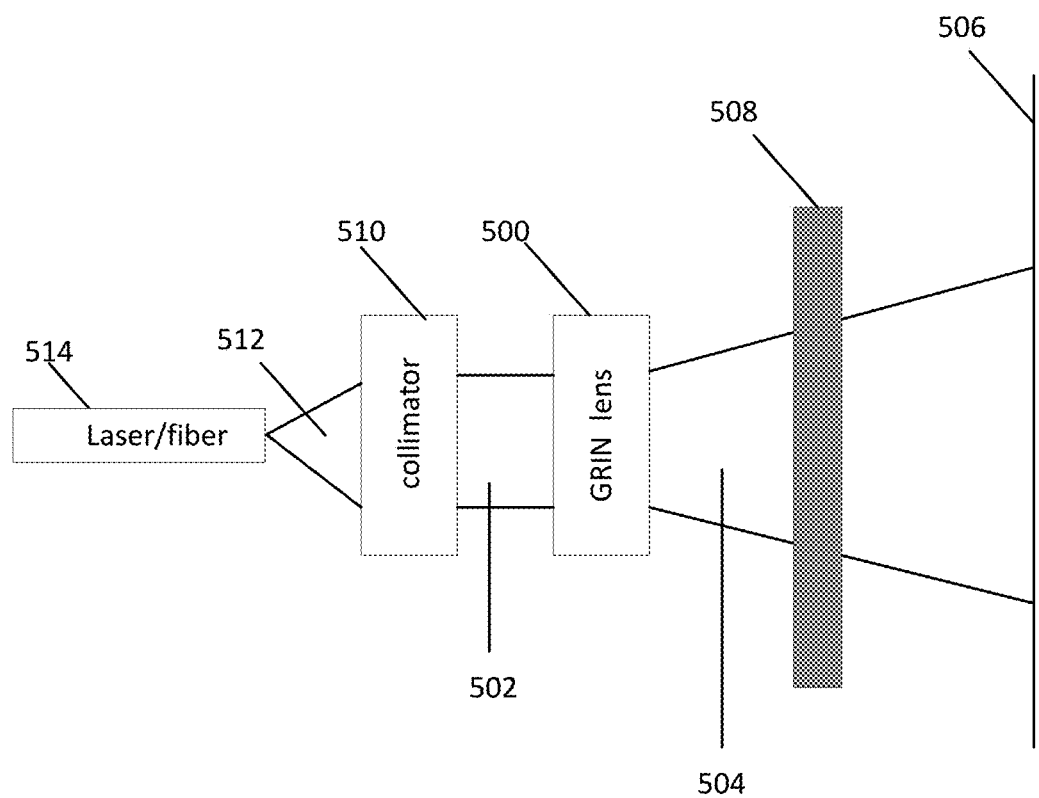
FIG. 5 illustrates an imaging apparatus comprising a single GRIN lens, according to one or more embodiments of the invention.

FIG. 5 illustrates an imaging apparatus comprising a single GRIN lens 500, wherein the single GRIN lens 500 refracts a collimated beam 502, forming a refracted beam 504. The refracted beam 504 forms interference fringes on the array 506 of pixels in a camera after the refracted beam 506 is transmitted through the sample 508. Also shown is the collimator lens 510 collimating electromagnetic radiation 512 emitted from an electromagnetic source such as a laser 514. In one or more embodiments, interaction of the refracted beam with the sample provides an interference/something to interfere with so that interference fringes are obtained on the array.

Figure 6A:
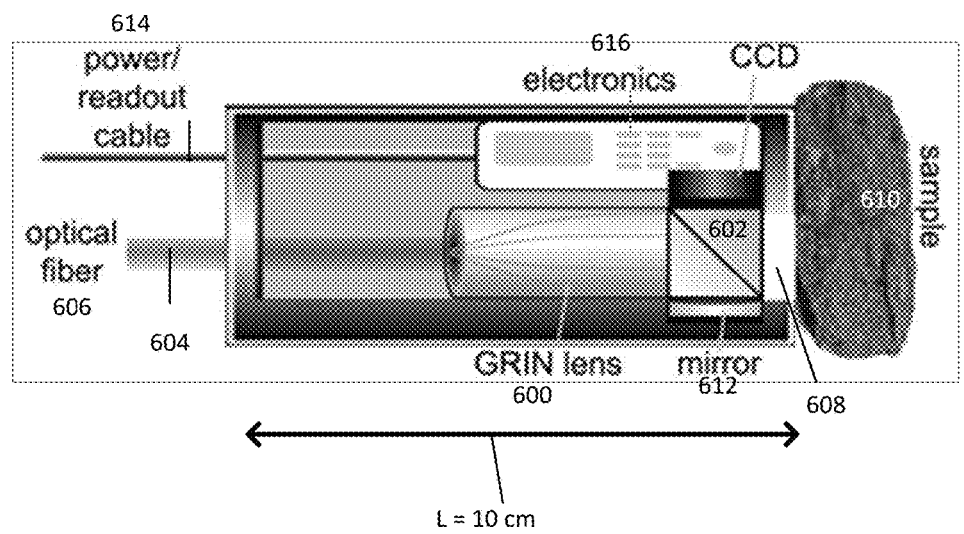
FIG. 6A illustrates an imaging apparatus comprising a single GRIN lens and a beamsplitter, according to one or more embodiments of the invention.

FIG. 6A illustrates an imaging apparatus comprising a single GRIN lens 600 and a beamsplitter 602 electromagnetically coupled to the GRIN lens 600 and a camera (Charge Coupled Device, CCD). The GRIN lens 600 refracts electromagnetic radiation 604 (e.g., a collimated beam) emitted from an electromagnetic source 606 (such as an optical fiber or laser), thereby forming a refracted beam. The beamsplitter 602 splits the refracted beam into a first portion 608 and a second portion. The first portion 608 reflects off the sample 610 forming a sample beam and the beamsplitter reflects the sample beam onto the array. The second portion reflects off a mirrored surface (e.g., mirror 612) coupled to the beamsplitter 602, forming a reference beam transmitted through the beamsplitter 602 and onto the CCD (which may comprise an array of pixels). The sample beam and the reference beam interfere on the array, forming the interference fringes. Also shown in FIG. 6 are a power/readout cable 614 connected to electronics 616 for processing the signal detected on the CCD in response to the interference fringes. The length L of the apparatus is 10 cm, for example.

In one embodiment, the beam splitter is silvered on one of the of the faces and has the CCD attached on another face. In one embodiment, the imaging is done without magnification (so the resolution limit is at or near the pixel pitch) and focus is done using algorithms for reconstruction of images from digital holograms.

Figure 6B:
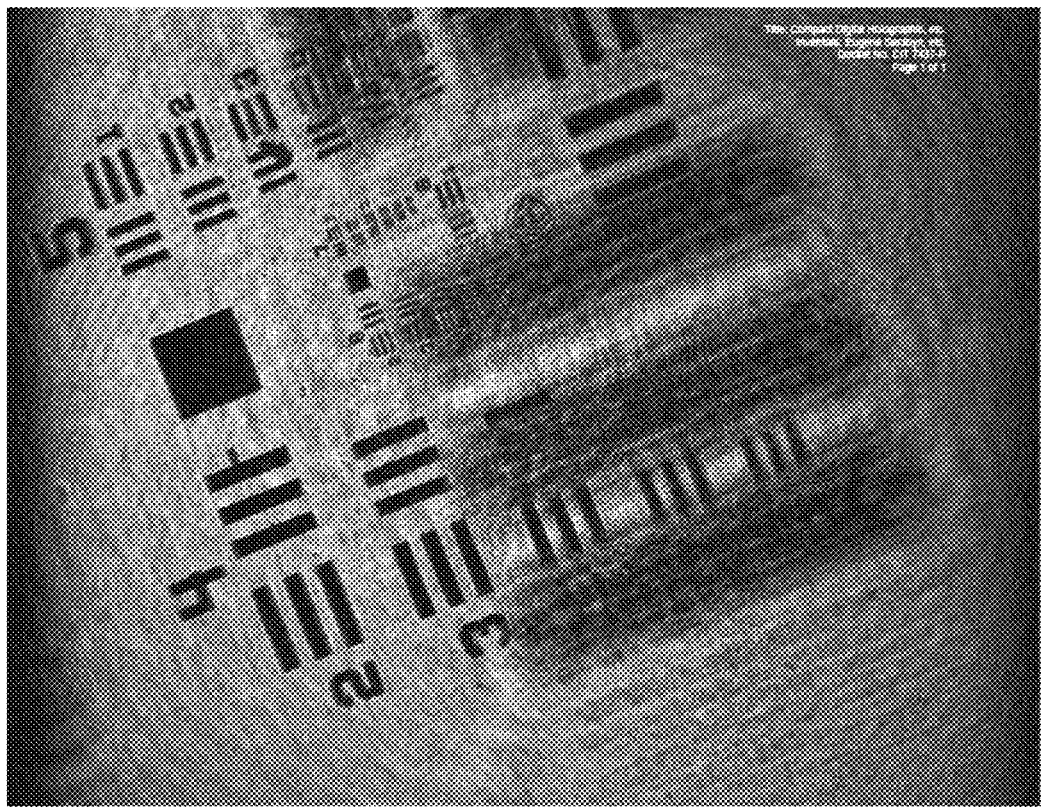
FIG. 6B is a reconstructed image of an Air force target used as the sample and acquired using the apparatus of FIG. 6A.

FIG. 6B is a reconstructed image of an Air force target used as the sample and acquired using the apparatus of FIG. 6A.

Optical Fiber Example

Figure 7:
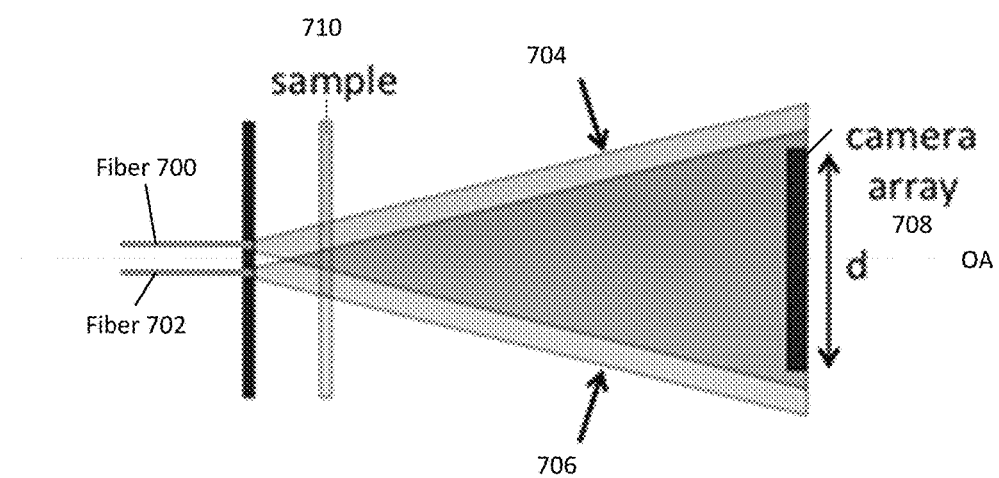
FIG. 7 illustrates an imaging apparatus comprising a pair of fibers, according to one or more embodiments of the invention.

FIG. 7 illustrates an imaging apparatus comprising the pair of optical fibers including a first optical fiber 700 spaced from a second optical fiber 702. A first diverging beam 704 is emitted from the first optical fiber 700 and a second diverging beam 706 is emitted from the second optical fiber 702. The first diverging beam 704 and the second diverging beam 706 interfere on the array 708, forming the interference fringes, after the first diverging beam 704 and the second diverging beam 706 are transmitted through the sample 710. In one or more embodiments, the fibers 700, 702 are coupled to, and transmit electromagnetic radiation emitted from, one laser source. The electromagnetic radiation from the laser source and transmitted through the fibers 700, 702 then emerges from the fibers 700, 702 as the first and second diverging beams 704, 706.

Process Steps

Figure 8:
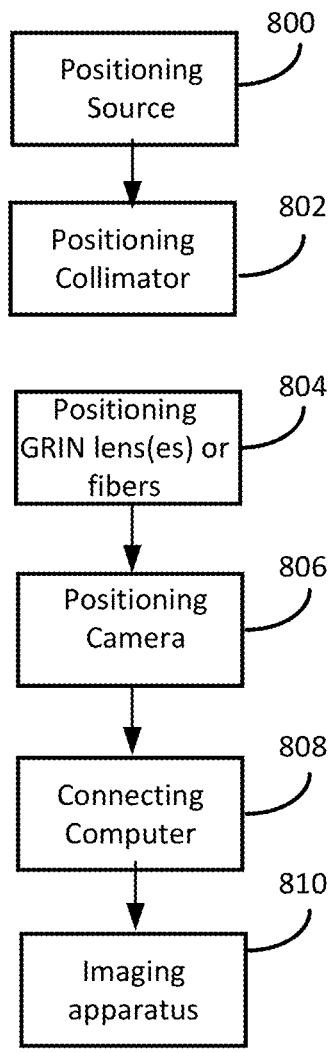
FIG. 8 is a flowchart illustrating a method of fabricating an imaging apparatus, according to one or more embodiments.

FIG. 8 illustrates a method of fabricating and using an imaging apparatus according to one or more embodiments.

Block 800 represents optionally obtaining or positioning a source of electromagnetic radiation, such as a laser (e.g., a fiber laser), or an optical fiber coupled to a laser.

Block 802 represents optionally positioning a collimator (e.g., collimating lens) to collimate the electromagnetic radiation emitted from the source, thereby forming a collimated beam.

Block 804 represents positioning one or more GRIN lenses or a pair of optical fibers.

Block 806 represents positioning a camera or detector comprising an array of pixels or detectors, wherein the camera is spaced from the one or more GRIN lenses or the pair of optical fibers.

Block 808 optionally connecting a computer or processor for processing an image from the interference fringes formed by the apparatus into an image or electric field map (phase and/or amplitude map) of the sample.

Block 810 represents the end result, an imaging apparatus or system one or more GRIN lenses or a pair of optical fibers; and a camera comprising an array of pixels spaced from the one or more GRIN lenses or the pair of optical fibers. One or more beams, refracted by the one or more GRIN lenses or emitted from the optical fibers, form interference fringes on the array after the one or more beams are transmitted through a sample positioned between the fibers and the camera or between the one or more GRIN lenses and the camera.

In one embodiment illustrated in FIG. 1A, the apparatus comprises a first GRIN lens 108 spaced from a second GRIN lens 110. The first GRIN lens 108 refracts the collimated beam 106, forming one of the beams comprising a first diverging beam 112. The second GRIN lens 110 refracts the collimated beam 106 forming another of the beams comprising a second diverging beam 114. The first diverging beam 112 and the second diverging beam 114 interfere on the array 118, forming the interference fringes, after the first diverging beam and the second diverging beam are transmitted through the sample 116. In one or more embodiments, the sample diffracts the diverging beams.

In one or more embodiments, the closer the spacing of the lenses, the larger the spacing of the interference fringes. In one or more embodiments, the spacing of the lenses is chosen so that the fringe spacing is not too fine to be measured by the pixels.

Other embodiments are illustrated in FIG. 5, FIG. 6A, and FIG. 7 described above.

In one embodiment, the array of pixels has a surface area and positioning from the assembly such that at least 90 percent of, or all of, the first diverging beam's 112 wavefront A and at least 90% of, or all of, the second diverging beam's 114 wavefront B are incident or captured on the array.

In one embodiment, the pixels have are selected to have a pitch p, the one or more beams have a wavelength λ, and the GRIN lenses 108, 110 or the fibers 700, 702 have the spacing b, such that fλ/b≥2p, where f is the focal length of the one or more GRIN lenses.

In one or more embodiments, the GRIN lenses 108, 110 or the optical fibers 700, 702 are symmetrically spaced about a position on an optical axis OA of the imaging system.

In one or more embodiments, the computer (e.g., electronics connected to the camera generates an image of the sample or an electric field map of the sample using the interference fringes, and the image resolves a feature in the sample having a dimension down to 1.5 microns.

In one or more embodiments, the apparatus has a length of 10 cm or less and the array has a surface area of at least 10 mm by 10 mm.

In one or more embodiments, the magnification and resolution of the imaging apparatus depend on the location of the sample relative to the camera and the camera properties (size of the array and size of the pixels). In one or more embodiments, a number of pixels and surface area of the array are increased so as to achieve a magnification of at least 100. One or more embodiments have made the surprising and unexpected discovery that increasing a number of the pixels and a surface area of the array increases a magnification of the imaging system.

In one or more embodiments, the GRIN lenses 108, 110 or fibers 700, 702 have substantially identical dimensions, consist essentially of substantially identical materials, and have substantially identical optical properties including refractive index.

Processing Environment

Figure 9:
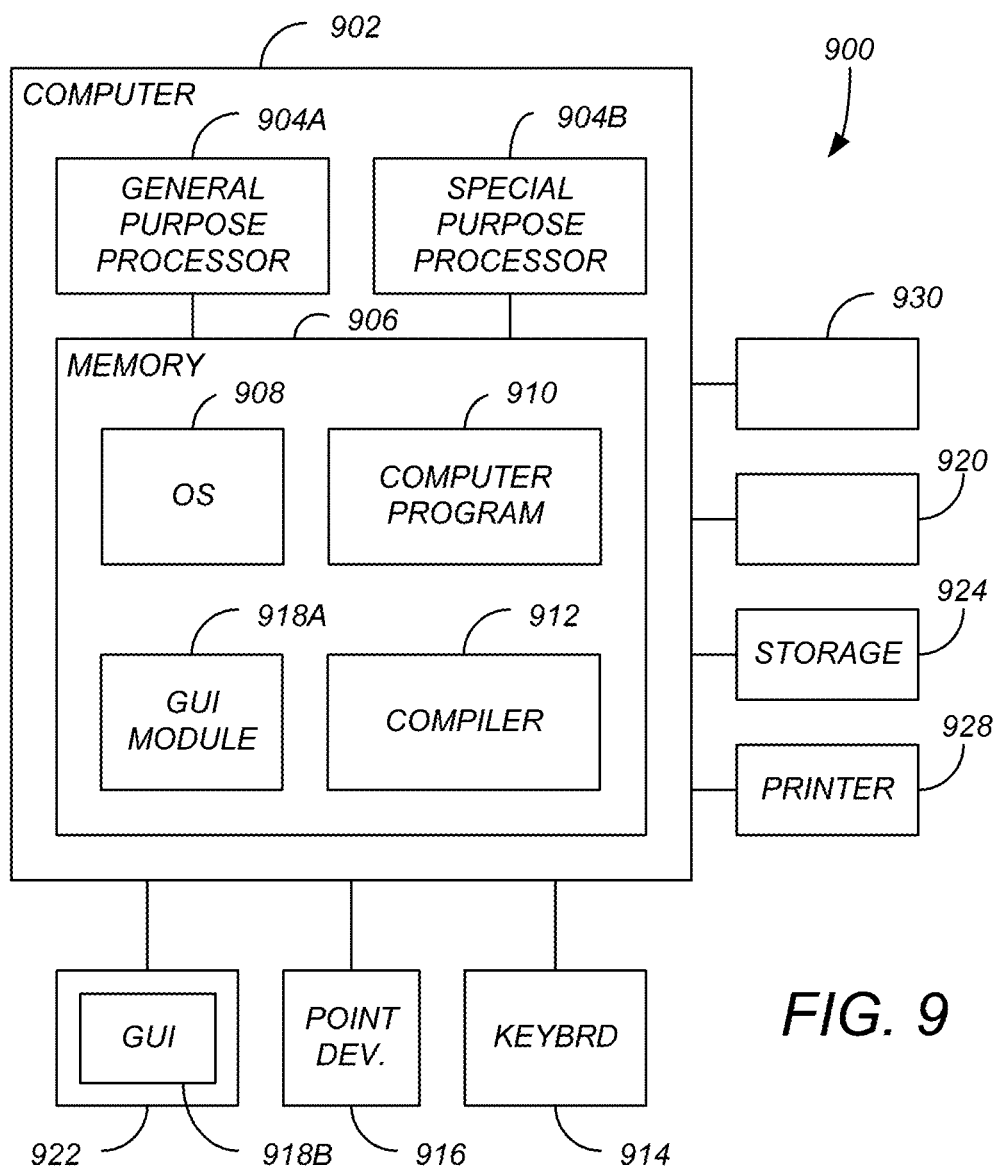
FIG. 9 is a hardware environment for implementing one or more embodiments of the invention.

FIG. 9 illustrates a system that is coupled to the imaging apparati 930 described herein, according to one or more embodiments, in order to process the interference fringes into an image or electric field map, or provide other processing functions. The computer 902 comprises a processor 904 and a memory, such as random access memory (RAM) 906. In embodiments requiring a human interface, the computer 902 is operatively coupled to a display 922, which presents images such as windows to the user on a graphical user interface 918B. The computer 902 may be coupled to other devices, such as a keyboard 914, a mouse device 916, a printer, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as Java, C++, C#, or other language to be translated into processor 904 readable code. After completion, the application 910 accesses and manipulates data stored in the memory 906 of the computer 902 using the relationships and logic that was generated using the compiler 912. Analogous results can be accomplished with field programmable gate arrays (FPGAs) or other circuits. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906, thereby making a computer program product or article of manufacture. As such, the terms "article of manufacture," "program storage device" and "computer program product" as used herein are intended to encompass a computer program accessible from any computer readable device or media.

It is understood that the foregoing embodiment of the computer system includes peripherals (e.g. display 922, GUI module 918A, GUI 918, mouse device 919, keyboard 914, printer 928 or compiler 912) that may be useful in some applications but not others.

Those skilled in the art will recognize many modifications may be made to this configuration without departing from the scope of the present disclosure. For example, those skilled in the art will recognize that any combination of the above components, or any number of different components, peripherals, and other devices, may be used.

Advantages and Improvements

Digital holographic microscopy allows imaging at high resolution with very high depth of field (at least 50× greater than a comparable conventional imaging system) with the same data volume and similar size (or smaller) optical system, and without having to have moving parts for focus, since many of the optics are replaced by digital reconstruction of the images from the hologram. It also enables the heights of features to be determined (by knowing the image reconstruction plane) to better understand 3D features than is possible with conventional imaging.

Existing cameras and endoscopes typically use fixed focus lenses that sacrifice either resolution to get an increased focus depth, or depth of focus to get increased resolution. However, medical endoscopy requires high resolution and the ability to get images over a large depth of field in a wet environment, and planetary imaging on mars or icy moons have similar requirements. In both cases, using a reflective microscope (illumination and observation on the same side of the object) is desired. We have already developed a digital holographic microscope for observing microbial motility in aqueous environments (e.g. submersed in the ocean or a subglacial body of water on an icy moon), and needed to extend the capability to reflection microscopy to be appealing to additional science goals.

Embodiments of the present invention describe multiple solutions that have many applications. In one embodiment, the imaging apparatus is a very useful imager for high resolution imaging of rocks or fluids on other planets (e.g. Mars or Europa). In one or more embodiments, the imaging apparatus is made very compact and uses low power, and offers "compressive sensing" by recording all of the images in the large target volume within each hologram (by recording an interference pattern that encodes the phase of the light as well as the intensity). Other applications include, but are not limited to, medical applications in endoscopy, where the ability to image at high resolution over a larger depth can improve the image quality and the ability of doctors to diagnose pathologies.

One or more embodiments of the present invention have made the unexpected and surprising discovery that resolution of the camera using the GRIN lenses is determined by the size of the array, and that a 1 mm by 1 mm array with 1 micron by 1 micron pixels may have lower resolution than a 10 mm by 10 mm array with 10 micron by 10 micron pixels.

Further information on one or more embodiments of the invention may be found in reference [35].

REFERENCES

The following references are incorporated by reference herein.

[1] B. Sherr, E. Sherr, and P. del Giorgio, "Enumeration of total and highly active bacteria," Methods Microbiol. 30, 129-159 (2001).
[2] J. G. Mitchell and K. Kogure, "Bacterial motility: links to the environment and a driving force for microbial physics," FEMS Microbiol. Ecol. 55(1), 3-16 (2006).
[3] K. Son, D. R. Brumley, and R. Stocker, "Live from under the lens: exploring microbial motility with dynamic imaging and microfluidics," Nat. Rev. Microbiol. 13(12), 761-775 (2015).
[4] J. Nadeau, C. Lindensmith, J. W. Deming, V. I. Fernandez, and R. Stocker, "Microbial morphology and motility as biosignatures for outer planet missions," Astrobiology 16(10), 755-774 (2016), doi:10.1089/ast.2015.1376.
[5] N. Thomas, B. S. Lüthi, S. F. Hviid, H. U. Keller, W. J. Markiewicz, T. Blümchen, A. T. Basilevsky, P. H. Smith, R. Tanner, C. Oquest, R. Reynolds, J.-L. Josset, S. Beauvivre, B. Hofmann, P. Rüffer, and C. T. Pillinger, "The microscope for Beagle 2," Planet. Space Sci. 52(9), 853-866 (2004).
[6] K. S. Edgett, R. A. Yingst, M. A. Ravine, M. A. Caplinger, J. N. Maki, F. T. Ghaemi, J. A. Schaffner, J. F. Bell III, L. J. Edwards, K. E. Herkenhoff, E. Heydari, L. C. Kah, M. T. Lemmon, M. E. Minitti, T. S. Olson, T. J. Parker, S. K. Rowland, J. Schieber, R. J. Sullivan, D. Y. Sumner, P. C. Thomas, E. H. Jensen, J. J. Simmonds, A. J. Sengstacken, R. G. Willson, and W. Goetz, "Curiosity's Mars Hand Lens Imager (MAHLI) Investigation," Space Sci. Rev. 170(1-4), 259-317 (2012).
[7] M. K. Kim, *Digital Holographic Microscopy Principles, Techniques, and Applications* (Springer, 2011).
[8] S. Seo, T.-W. Su, D. K. Tseng, A. Erlinger, and A. Ozcan, "Lensfree holographic imaging for on-chip cytometry and diagnostics," Lab Chip 9(6), 777-787 (2009).
[9] O. Mudanyali, D. Tseng, C. Oh, S. O. Isikman, I. Sencan, W. Bishara, C. Oztoprak, S. Seo, B. Khademhosseini, and A. Ozcan, "Compact, light-weight and cost-effective microscope based on lensless incoherent holography for telemedicine applications," Lab Chip 10(11), 1417-1428 (2010).
[10] J. K. Wallace, S. Rider, E. Serabyn, J. Kuhn, K. Liewer, J. Deming, G. Showalter, C. Lindensmith, and J. Nadeau, "Robust, compact implementation of an off-axis digital holographic microscope," Opt. Express 23(13), 17367-17378 (2015).
[11] C. A. Lindensmith, S. Rider, M. Bedrossian, J. K. Wallace, E. Serabyn, G. M. Showalter, J. W. Deming, and J. L. Nadeau, "A submersible, off-axis holographic microscope for detection of microbial motility and morphology in aqueous and icy environemnts," PLoS One 11(1), e0147700 (2016).
[12] G. W. Stroke, "Lensless Fourier-transform method for optical holography," Appl. Phys. Lett. 6(10), 201-203 (1965).
[13] W. S. Haddad, D. Cullen, J. C. Solem, J. W. Longworth, A. McPherson, K. Boyer, and C. K. Rhodes, "Fourier-transform holographic microscope," Appl. Opt. 31(24), 4973-4978 (1992).
[14] W. Xu, M. H. Jericho, I. A. Meinertzhagen, and H. J. Kreuzer, "Digital in-line holography for biological applications," Proc. Natl. Acad. Sci. U.S.A. 98(20), 11301-11305 (2001).
[15] L. Repetto, E. Piano, and C. Pontiggia, "Lensless digital holographic microscope with light-emitting diode illumination," Opt. Lett. 29(10), 1132-1134 (2004).
[16] U. A. Gurkan, S. Moon, H. Geckil, F. Xu, S. Wang, T. J. Lu, and U. Demirci, "Miniaturized lensless imaging systems for cell and microorganism visualization in point-of-care testing," Biotechnol. J. 6(2), 138-149 (2011).
[17] S. O. Isikman, W. Bishara, S. Mavandadi, F. W. Yu, S. Feng, R. Lau, and A. Ozcan, "Lens-free optical tomographic microscope with a large imaging volume on a chip," Proc. Natl. Acad. Sci. U.S.A. 108(18), 7296-7301 (2011).
[18] C. Zuo, J. Sun, J. Zhang, Y. Hu, and Q. Chen, "Lensless phase microscopy and diffraction tomography with multi-angle and multi-wavelength illuminations using a LED matrix," Opt. Express 23(11), 14314-14328 (2015).
[19] W. Bishara, U. Sikora, O. Mudanyali, T. W. Su, O. Yaglidere, S. Luckhart, and A. Ozcan, "Holographic pixel super-resolution in portable lensless on-chip microscopy using a fiber-optic array," Lab Chip 11(7), 1276-1279 (2011).
[20] C. Remacha, B. S. Nickerson, and H. J. Kreuzer, "Tomography by point source digital holographic microscopy," Appl. Opt. 53(16), 3520-3527 (2014).
[21] I. Pushkarsky, Y. Liu, W. Weaver, T.-W. Su, O. Mudanyali, A. Ozcan, and D. Di Carlo, "Automated single-cell motility analysis on a chip using lensfree microscopy," Sci. Rep. 4, 4717 (2014).
[22] T.-W. Su, L. Xue, and A. Ozcan, "High-throughput lensfree 3D tracking of human sperms reveals rare statistics of helical trajectories," Proc. Natl. Acad. Sci. U.S.A. 109(40), 16018-16022 (2012).
[23] T.-W. Su, I. Choi, J. Feng, K. Huang, E. McLeod, and A. Ozcan, "Sperm trajectories form chiral ribbons," Sci. Rep. 3, 1664 (2013).
[24] K. Sato and O. Murata, "Lens-less holographic microscope with high resolving power and no-distortion," Proc. SPIE 7904, 790402 (2011).
[25] M. H. Jericho, H. J. Kreuzer, M. Kanka, and R. Riesenberg, "Quantitative phase and refractive index measurements with point-source digital in-line holographic microscopy," Appl. Opt. 51(10), 1503-1515 (2012).
[26] E. Serabyn, K. Liewer, K. Wallace, S. Rider, C. Lindensmith, and J. Nadeau "Lensless digital holographic microscopy for microbe detection," in *Imaging and Applied Optics* 2016, OSA Technical Digest (online) (2016), paper DTh3F.4.
[27] E. Hecht, *Optics,* 4th ed. (Addison Wesley, 2002).
[28] G. Pedrini and H. J. Tiziani, "Short-coherence digital microscopy by use of a lensless holographic imaging system," Appl. Opt. 41(22), 4489-4496 (2002).

[29] E. Cuche, P. Marquet, and C. Depeursinge, "Spatial filtering for zero-order and twin-image elimination in digital off-axis holography," Appl. Opt. 39(23), 4070-4075 (2000).
[30] http://www.lynceetec.com/koala-acquisition-analysis/
[31] T. Colomb, "Numerical aberrations compensation and polarization imaging in digital holographic microscopy," thesis no. 3455 (Institut d'imagerie et optique appliquée, École Polytechnique Fédérale de Lausanne, 2006).
[32] J. Schindelin, I. Arganda-Carreras, E. Frise, V. Kaynig, M. Longair, T. Pietzsch, S. Preibisch, C. Rueden, S. Saalfeld, B. Schmid, J. Y. Tinevez, D. J. White, V. Hartenstein, K. Eliceiri, P. Tomancak, and A. Cardona, "Fiji: an open-source platform for biological-image analysis," Nat. Methods 9(7), 676-682 (2012).
[33] K. Junge, H. Eicken, and J. W. Deming, "Motility of *Colwellia psychrerythraea* strain 34H at subzero temperatures," Appl. Environ. Microbiol. 69(7), 4282-4284 (2003).
[34] Y. Pu and H. Meng, "Intrinsic speckle noise in off-axis particle holography," J. Opt. Soc. Am. A 21(7), 1221-1230 (2004).
[35] Compact, lensless digital holographic microscope for remote microbiology, by Eugene Serabyn et. al., Optics Express, Vol. 24. No. 25, page 28540 (2016).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An imaging system, comprising:
a pair of gradient-index (GRIN) lenses comprising a first GRIN lens spaced from a second GRIN lens, or a pair of optical fibers comprising a first optical fiber spaced from a second optical fiber; and
a camera comprising an array of pixels, wherein:
the camera is spaced from the pair of the GRIN lenses or the pair of the optical fibers, and
interference between:
a reference beam, refracted by the first GRIN lens or emitted from the first optical fiber, and
an object beam refracted by the second GRIN lens or emitted from the second optical fiber,
forms interference fringes on the array after the reference beam and the object beam are transmitted through a sample positioned between the pair of the optical fibers and the camera or between the pair of the GRIN lenses and the camera.

2. The imaging system of claim 1, comprising the first GRIN lens spaced from the second GRIN lens, wherein:
the first GRIN lens refracts a collimated beam, forming the reference beam comprising a first diverging beam,
the second GRIN lens refracts the collimated beam, forming the object beam comprising a second diverging beam, and
the first diverging beam and the second diverging beam interfere on the array, forming the interference fringes, after the first diverging beam and the second diverging beam are transmitted through the sample.

3. The imaging system of claim 2, further comprising a collimator between the GRIN lenses and a laser, the collimator collimating electromagnetic radiation emitted from the laser and forming the collimated beam.

4. The imaging system of claim 1,
comprising the pair of optical fibers including the first optical fiber spaced from the second optical fiber, wherein:
the reference beam comprises a first diverging beam emitted from the first optical fiber, and
the object beam comprises a second diverging beam emitted from the second optical fiber, and
the first diverging beam and the second diverging beam interfere on the array, forming the interference fringes, after the first diverging beam and the second diverging beam are transmitted through the sample.

5. An imaging apparatus, comprising:
a single GRIN lens; and
a camera comprising an array of pixels, wherein:
the single GRIN lens refracts a collimated beam, forming a single refracted beam, and
the single refracted beam forms interference fringes on the array of pixels after the single refracted beam is transmitted through a sample between the single GRIN lens and the camera.

6. The imaging apparatus of claim 5, further comprising:
a beamsplitter electromagnetically coupled to the single GRIN lens and the camera, wherein
the beamsplitter splits the single refracted beam into a first portion and a second portion,
the first portion reflects off the sample forming a sample beam,
the beamsplitter reflects the sample beam onto the array,
the second portion reflects off a mirrored surface coupled to the beamsplitter, forming a reference beam transmitted through the beamsplitter and onto the array, and
the sample beam and the reference beam interfere on the array, forming the interference fringes.

7. The imaging system of claim 1, wherein the array of pixels has a surface area and positioning from an assembly comprising the pair of GRIN lenses or the pair of optical fibers such that at least 90 percent of the reference beam's wavefront and at least 90% of the object beam's wavefront are incident on the array.

8. The imaging system of claim 1, wherein the array of pixels has a surface area and positioning from an assembly comprising the pair of GRIN lenses or the pair of optical fibers such that all of the reference beam's wavefront and all of the object beam's wavefront are captured on the array.

9. The imaging system of claim 1, wherein:
the pixels have a pitch p,
the reference beam and the object beam have a wavelength $\lambda$,
the GRIN lenses have the spacing b,
such that $f\lambda/b \geq 2p$, where f is the focal length of the GRIN lenses.

10. The imaging system of claim 1, wherein the GRIN lenses or the optical fibers are symmetrically spaced about a position on an optical axis of the imaging system, the camera intersects with the optical axis, and the optical axis is a straight line from the position to the camera.

11. The imaging system of claim 1, wherein a number of pixels and surface area of the array are increased so as to achieve a magnification of at least 100.

12. A digital holographic microscope comprising the imaging system of claim 1, wherein:
a computer connected to the camera generates an image of the sample or an electric field map of the sample using the interference fringes, and
the image resolves a feature in the sample having a dimension down to 1.5 microns.

13. The imaging apparatus of claim 1, comprising a length of 10 cm or less and wherein the array has a surface area of at least 10 mm by 10 mm.

14. The imaging system of claim 1, wherein no optical elements (other than the sample) are between the GRIN lenses or the optical fibers and the array.

15. A method of fabricating an imaging system, comprising:
positioning a pair of gradient-index (GRIN) lenses comprising a first GRIN lens spaced from a second GRIN lens, or
positioning a single GRIN lens, or
positioning a pair of optical fibers comprising a first optical fiber spaced from a second optical fiber; and
positioning a camera comprising an array of pixels, wherein:
the camera is spaced from the pair of the GRIN lenses or the pair of the optical fibers, or the single GRIN lens, and
the single GRIN lens refracts a collimated beam, forming the beam comprising a single refracted beam, and the single refracted beam forms interference fringes on the array of pixels after the single refracted beam is transmitted through the sample: or
interference between:
a reference beam, refracted by the first GRIN lens or emitted from the first optical fiber, and
an object beam, refracted by the second GRIN lens or emitted from the second optical fiber,
forms interference fringes on the array after the reference beam and the object beam are transmitted through a sample positioned between the pair of the optical fibers and the camera or between the pair of the GRIN lenses and the camera.

16. The method of claim 15, further comprising positioning the pair of the GRIN lenses including the first GRIN lens spaced from the second GRIN lens, wherein:
the first GRIN lens refracts a collimated beam, forming the reference beam comprising a first diverging beam,
the second GRIN lens refracts the collimated beam, forming the object beam comprising a second diverging beam, and
the first diverging beam and the second diverging beam interfere on the array, forming the interference fringes, after the first diverging beam and the second diverging beam are transmitted through the sample.

17. The method of claim 16, further comprising positioning a collimator between the GRIN lenses and a laser, the collimator collimating electromagnetic radiation emitted from the laser and forming the collimated beam.

18. The method of claim 15, further comprising positioning the pair of optical fibers including the first optical fiber spaced from the second optical fiber, wherein:
the reference beam comprises a first diverging beam emitted from the first optical fiber, and
the object beam comprises a second diverging beam emitted from the second optical fiber, and
the first diverging beam and the second diverging beam interfere on the array, forming the interference fringes, after the first diverging beam and the second diverging beam are transmitted through the sample.

19. The method of claim 15, further comprising positioning a single one of the one or more GRIN lenses, wherein:
the single GRIN lens refracts a collimated beam, forming the beam comprising a refracted beam, and
the refracted beam forms interference fringes on the array of pixels after the refracted beam is transmitted through the sample.

20. The method of claim 19, further comprising:
positioning a beamsplitter electromagnetically coupled to the single GRIN lens and the camera, wherein:
the beamsplitter splits the single refracted beam into a first portion and a second portion,
the first portion reflects off the sample forming a sample beam,
the beamsplitter reflects the sample beam onto the array,
the second portion reflects off a mirrored surface coupled to the beamsplitter, forming a reference beam transmitted through the beamsplitter and onto the array, and
the sample beam and the reference beam interfere on the array, forming the interference fringes.

21. The method of claim 15, further comprising:
increasing a number of the pixels and a surface area of the array so as to increase a magnification of the imaging system; and
using the interference fringes to generate an image of the sample or a map of an electric field in the sample.

* * * * *